US011928106B2

(12) United States Patent
Dangoor et al.

(10) Patent No.: US 11,928,106 B2
(45) Date of Patent: Mar. 12, 2024

(54) DATABASE AUTO-DOCUMENTATION SYSTEMS AND METHODS

(71) Applicant: INTUIT INC., Mountain View, CA (US)

(72) Inventors: Sheer Dangoor, Tel Aviv (IL); Aviv Ben Arie, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 104 days.

(21) Appl. No.: 17/649,459

(22) Filed: Jan. 31, 2022

(65) Prior Publication Data

US 2023/0244658 A1 Aug. 3, 2023

(51) Int. Cl.
*G06F 16/242* (2019.01)
*G06F 16/21* (2019.01)
*G06F 16/22* (2019.01)
*G06F 40/211* (2020.01)

(52) U.S. Cl.
CPC ........ *G06F 16/2428* (2019.01); *G06F 16/211* (2019.01); *G06F 16/2246* (2019.01); *G06F 16/2423* (2019.01); *G06F 16/2433* (2019.01); *G06F 40/211* (2020.01)

(58) Field of Classification Search
CPC ............. G06F 16/2428; G06F 16/2246; G06F 16/2433; G06F 16/211; G06F 16/2423; G06F 40/211
See application file for complete search history.

(56) References Cited

U.S. PATENT DOCUMENTS

| 9,104,728 | B2 * | 8/2015 | Ngai | G06F 16/24542 |
| 10,262,076 | B2 * | 4/2019 | Chang | G06F 16/8358 |
| 2012/0016901 | A1 * | 1/2012 | Agarwal | G06F 16/258 |
| | | | | 707/769 |
| 2021/0019338 | A1 * | 1/2021 | Grampurohit | G06F 3/0481 |
| 2021/0117437 | A1 * | 4/2021 | Gibson | G06F 16/258 |
| 2021/0248143 | A1 * | 8/2021 | Khillar | G06F 16/2379 |
| 2022/0300491 | A1 * | 9/2022 | Gruszecki | G06F 16/2393 |
| 2023/0130267 | A1 * | 4/2023 | Mukherjee | G06F 16/2448 |
| | | | | 707/760 |

OTHER PUBLICATIONS

11. Gavin et al. "SQL Server Drop Table If Exists Examples", 2021, pp. 1-4 (Year: 2021).*

(Continued)

*Primary Examiner* — Matthew J Ellis
(74) *Attorney, Agent, or Firm* — DLA PIPER LLP (US)

(57) ABSTRACT

Systems and methods are described for automatically documenting queries and dynamically populating interactive graphical user interfaces with query recommendations. A computing system receives an initial query from an interactive graphical user interface and asynchronously parses the query for strings matching predetermined phrases. In response to determining that the initial query recites strings matching the predetermined phrases, the system extracts metadata and identifies a table name in the initial query, and modifies a table data in key-value data structure corresponding to the table. Subsequent queries related to the initial query cause the system to asynchronously populate the graphical user interface with query recommendations related to the initial query.

20 Claims, 5 Drawing Sheets

(56) References Cited

OTHER PUBLICATIONS

Cao et al. https://ieeexplore.ieee.org/stamp/stamp.jsp?tp=&arnumber=10194972, "A Heterogeneous Graph to Abstract Syntax Tree Framework for Text-to-SQL", 2023 (Year: 2023).*

Drop Table Teradata Database SQL Data Definition Language Syntax and Examples, https://docs.teradata.com/r/eWpPpcMoLGQcZEoyt5AjEg/_dStmupz50B_bFZZ3G89Fw, retrieved on Dec. 31, 2021, 1 pg.

Saving and Sharing Queries, https://cloud.gogle.com/bigquery/docs/saving-sharing-queries, retrieved on Dec. 13, 2021, 7 pgs.

* cited by examiner

DATABASE AUTO-DOCUMENTATION SYSTEMS AND METHODS

BACKGROUND

Conventional database management for large organizations with complex datasets often maintain and manage data ranging in volume from terabytes to exabytes. In order to maintain databases comprised of complex datasets, users within large organizations typically implement numerous queries on a regular basis that can be taxing on the organization's security protocols and computational resources. In addition, conventional database management systems require active maintenance, which is often maintained by individual end users implementing separate manual solutions for version control and code storage that can result in redundant code creation and conflicting modifications.

For conventional systems, generating or retrieving such code involves manual processes implemented by individual users (e.g., software engineers), whose work product is often produced and then stored on a computing device isolated from other users that may benefit from the previously generated code. In this instance, while a database system may be properly maintained, subsequent users must engage in the redundant practice of recreating similar work product from scratch or engaging in rudimentary code retrieval practices if the work product can be copied and shared.

DETAILED DESCRIPTION OF SEVERAL EMBODIMENTS

Embodiments of the present disclosure relate to systems and methods for auto-documenting software-related queries and generating software-related recommendations for users as they create software-related queries in real-time. The implementation of these novel concepts may include, in one respect, generating a repository of accurate and error-free software-related queries (e.g., SQL code) by automatically saving queries as they are created in an interactive graphical user interface (GUI). In another respect, these automatically saved software-related queries may be made available for future use by implementing query syntax recognition techniques, such that previously stored software-related queries related to the user's real-time input may be dynamically populated as a query recommendation in the interactive (GUI) for the user's instantaneous use, thereby notifying the user of previously generated software-related queries relevant to the user's programming objective.

The instant systems and methods may leverage dynamic graphical user interfaces, advanced security protocols, and machine learning techniques in order to provide auto-documentation processes. In some examples, the machine learning and artificial learning techniques may be used to automate some of the processes. In addition, machine learning and artificial learning techniques may be used to enhance security, customize and configure one or more software or hardware components, and/or predict user activity (e.g., queries) based on training data refined on data gathered from user activity associated with similarly situated users. One having ordinary skill in the art will recognize that instant software-related queries (i.e., code) may be capable of creating additional software applications/modules and/or modify computer hardware, and consequently are more sophisticated and not meant to include internet-related search engine queries.

Figure 1:
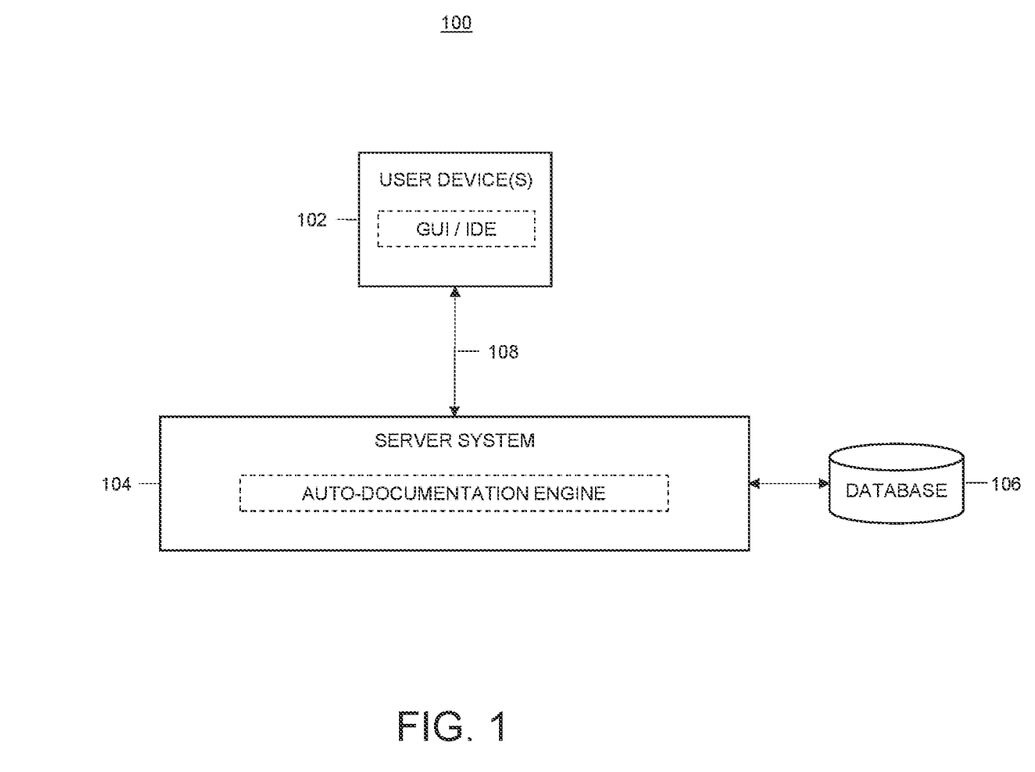
FIG. 1 illustrates a computing environment, according to various embodiments of the present disclosure.

Referring to FIG. 1, computing environment 100 may be configured for automatically documenting queries, according to embodiments of the present disclosure. Computing environment 100 may include one or more user devices 102, a server system 104, and a database 106 communicatively coupled to the server system 104. The user device 102, server system 104, and database 106 may be configured to communicate through network 108.

In one or more embodiments, user device 102 is operated by a user. User device 102 may be representative of a mobile device, a tablet, a desktop computer, or any computing system having the capabilities described herein. Users may include, but are not limited to, individuals such as, for example, software engineers, database administrators, subscribers, employees, clients, prospective clients, or customers of an entity associated with server system 104, such as individuals who have obtained, will obtain, or may obtain a product, service, or consultation from an entity associated with server system 104.

User device 102 according to the present disclosure may include, without limit, any combination of mobile phones, smart phones, tablet computers, laptop computers, desktop computers, server computers or any other computing device configured to capture, receive, store and/or disseminate any suitable data. In one embodiment, a user device 102 may include a non-transitory memory, one or more processors including machine readable instructions, a communications interface which may be used to communicate with the server system (and, in some examples, with the database 106), a user input interface for inputting data and/or information to the user device and/or a user display interface for presenting data and/or information on the user device. In some examples, the user input interface and the user display interface may be configured as an interactive GUI and/or an integrated development environment (IDE). The user device 102 may also be configured to provide the server system 104, via the interactive GUI, input information (e.g., database queries) for further processing. In some examples, the interactive GUI may be hosted by the server system 104 or it may be provided via a client application operating on the user device. In some embodiments, a user operating the user device 102 may be modifying one or more tables stored on database 106.

Server system 104 may host, store, and operate an auto-documentation engine for automatically documenting queries. The auto-documentation engine may enable asynchronous monitoring of queries inputted via an interactive GUI capable of receiving queries (e.g., database SQL queries) in real-time, and simultaneously from one or more users. The server system 104 may receive a query from one or more user device(s) 102 and further determine, via the auto-documentation engine, whether the received query is a candidate for auto-documentation by parsing the query for strings that match known phrases for creating or modifying a table. In response to determining that the received query is a candidate for auto-documentation, the server system 104 may implement processes for parsing the query for relevant syntax (e.g., a table name, command statements, and statement terminators) and extracting metadata from the query related to the user initiating the query, timestamp of table creation, and current table status. The server system 104 may then identify the table and the desired operation from the received query and generate query recommendations in real-time that may be provided to the user via the interactive GUI operating on the user device 102. The server system 104 may include security components capable of monitoring user rights and privileges associated with generating queries, accessing the server system 104, and modifying tables in the database 106. Accordingly, the server system 104 may be configured to manage user rights, manage access permissions for tables, object permissions, and the like. The server system 104 may be further configured to implement two-factor authentication, Secure Sockets Layer (SSL) protocols for encrypted communication sessions, biometric authentication, and token-based authentication. The server system 104 may include one or more processors, servers, databases, communication/traffic routers, non-transitory memory, modules, and interface components.

Database 106 may be locally managed or a cloud-based collection of organized data stored across one or more storage devices (e.g., databases). The database 106 may be complex and developed using one or more design schema and modeling techniques. The database system may be hosted at one or more data centers operated by a cloud computing service provider. The database 106 be geographically proximal to or remote from the server system 104 configured for data dictionary management, data storage management, multi-user access control, data integrity, backup and recovery management, database access language application programming interface (API) management, and the like. The database 106 may be in communication with the server system 104 and the user device via network 108. The database 106 may store various data, including one or more tables, that can be modified via queries initiated by users operating user device(s) 102. Various data in the database 106 may be refined over time using a machine learning model, for example the machine learning model discussed infra in FIG. 5. Additionally, the database system may be deployed and maintained automatically by one or more components shown in FIG. 1.

Network 108 may be of any suitable type, including individual connections via the Internet, such as cellular or Wi-Fi networks. In some embodiments, network 108 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

For example, network 108 may be the Internet, a private data network, virtual private network using a public network and/or other suitable connection(s) that enables components in computing environment 100 to send and receive information between the components of computing environment 100.

In some embodiments, communication between the elements may be facilitated by one or more application programming interfaces (APIs). APIs of server system 104 may be proprietary and/or may be examples available to those of ordinary skill in the art such as Amazon® Web Services (AWS) APIs or the like.

Figure 2:
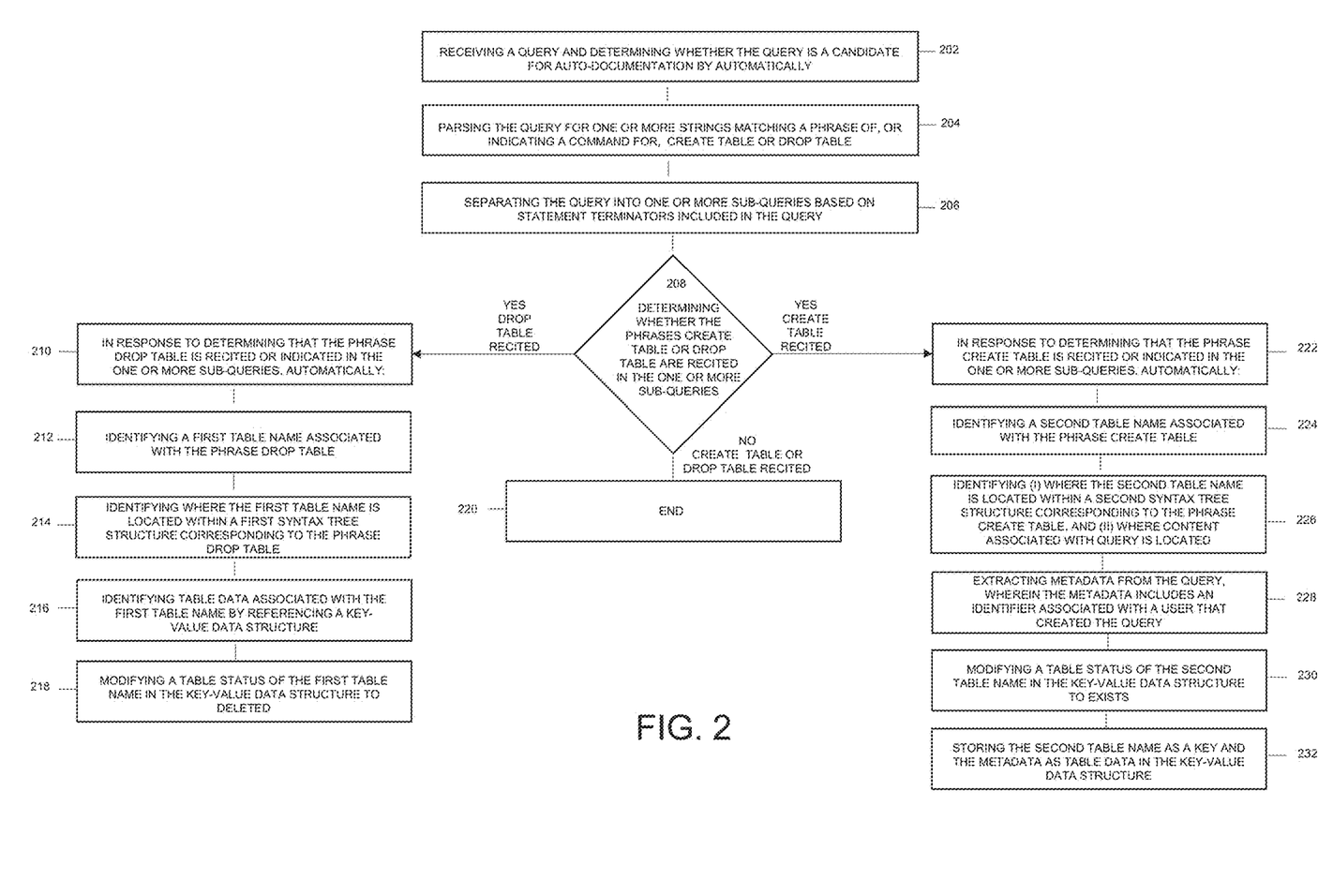
FIG. 2 illustrates a method for automatically documenting queries, according to various embodiments of the present disclosure.

Referring to FIG. 2, a method for automatically documenting queries is illustrated, according to various embodiments of the present disclosure. At 202, server system 104 may receive a query and determine whether the query is a candidate for auto-documentation by automatically: parsing the query for one or more strings matching a phrase of, or indicating a command for, "create table" or "drop table" as indicated in 204. For example, a user operating user device 102 may generate a query to modify a database via an interactive GUI, wherein the query is subsequently received by server system 104. Server system 104 may then automatically parse the query for strings that match or indicate phrases such as "create table" or "drop table" or other target phrases having similar or the same meanings. Here, the server system 104 may identify that phrase such as "create table" or "drop table" (or other target phrases having similar or the same meanings) may have been indicated or intended even though the phrases have misspellings, incomplete spellings, typographical errors, or synonyms of the terms recited therein.

At 206, the server system 104 may separate the query into one or more subqueries based on statement terminators included in the query. For example, server system 104 may identify statement terminators (e.g., one or more semicolons ";") and break the query into subqueries by separating the query at the identified statement terminators.

At 208, the server system 104 may determine whether the phrase "create table" or "drop table" or another target phrase is recited or indicated in the one or more subqueries. Here, for example, the server system 104 may analyze each subquery for known phrases (e.g., "create table" or "drop table"), as a query may include multiple command statements (e.g., multiple instances wherein "create table" or "drop table" are recited). In response to determining that "create table" and/or "drop table" is recited or indicated in the one or more subqueries, server system 104 may continue with the appropriate process for resolving the identified command statement and continue at either 210 or 222. Alternatively, the server system 104 may determine that the phrases (e.g., "create table" or "drop table") are not recited, and therefore, that the query is not a candidate for auto-documentation and end the process at step 220.

At 210, in response to determining that the phrase "drop table" is recited or indicated in the one or more subqueries, the server system 104 may automatically identify a first table name associated with, and modified by, the phrase "drop table" as indicated in 212. For example, in at least one subquery, the server system 104 may identify the name of a table recited in the sub-query that may be deleted according to the "drop table" command statement.

At 214 the server system 104 may then identify where the first table name is located within a first syntax tree structure corresponding to the "drop table" phrase. For example, the server system 104 may follow the syntax tree structure associated with the "drop table" command to identify a leaf where the table name is located. This act of following the "drop table" syntax tree structure limits the set of actions that can be taken upon the table to those associated with the initial command.

At 216 the server system 104 may then identify table data associated with the first table name by referencing a key value data structure. Here, the server system 104 may reference a key-value data structure (e.g., a data store for referencing stored values using an identifier, that is, a key) using the table name as the key.

At 218 the server system 104 may then modify table status of the first table name in the key value data structure to "deleted." For example, the server system may modify the status of the table associated with the table name to from "existing" to "deleted." In this instance, only that status of the table is modified so that queries and table data associated with the table name will be available for future use.

Referring back to 208 as an alternative to determining that the phrase "drop table" is recited or indicated in the one or more subqueries, server system 104 may determine that no relevant or appropriate strings match the phrase "create table" or "drop table" and end the process at 220.

Alternatively, server system 104 may determine that the phrase "create table" is recited or indicated in one or more subqueries at 222. For example, in at least one subquery, the server system 104 may identify that the string "create table" has been recited or indicated. The server system 104 may then identify a second table name associated with the phrase create table at 224. For example, in at least one subquery, the server system 104 may identify the name of a table recited in the subquery that may be created in the database 106 according to the "create table" command statement.

At 226, server system 104 may then identify where the second table name is located within a second syntax tree corresponding to the phrase "create table" and where content associated with the query is located. For example, the server system 104 may follow the syntax tree structure associated with the "create table" command to identify a leaf where the table name is located. This act of following the "create table" syntax tree structure limits the set of actions that can be taken upon the table to those associated with the initial command.

At 228 server system 104 may then extract metadata from the query where in the metadata may include an identifier associated with the user that created the query. Here, for example, the server system 104 may be configured to analyze the query to identify the user device, a username associated with the user that generated the query, permissions (e.g., access permission, read/write permissions, and the like) associated with the database 106 and queried table(s), the time the query was created, the query used to create the table, the table status, and a version associated with the table.

At 230 server system 104 may then modify the table status of the second table name in the key-value data structure to "exists." For example, the server system 104 may update the key-value data structure such that the second table name is stored as currently existing in database 106. At 232, server system 104 may then automatically store the second table name as a key and the metadata as table data in the key value data structure. Here, the server system 104 modifies the key-value data structure such that the second table name and extracted metadata are stored as referenceable, modifiable, and retrievable datapoints without user input indicating that such information should be saved.

Figure 3:
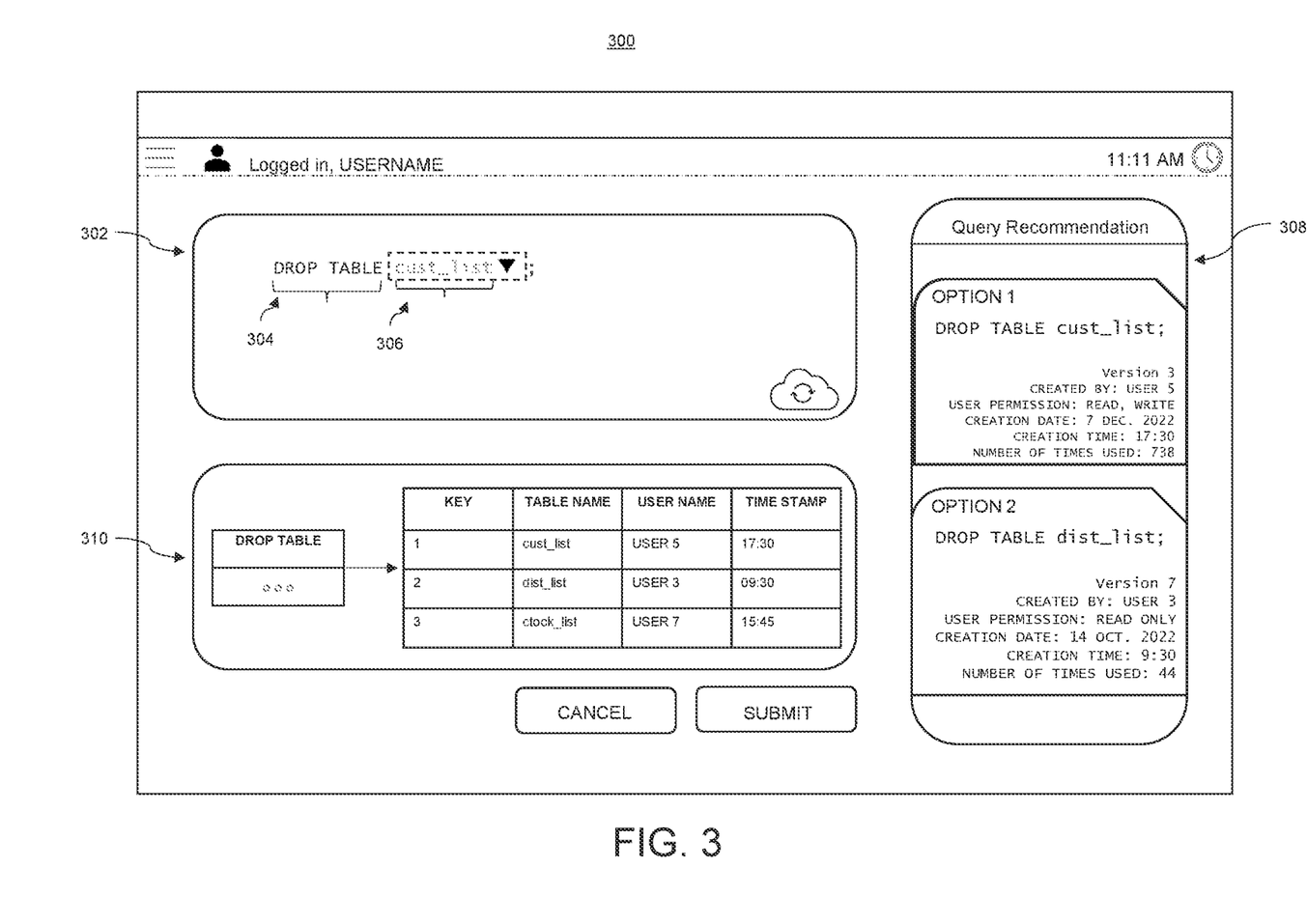
FIG. 3 illustrates a graphical user interface, according to example embodiments of the present disclosure.

FIG. 3 illustrates an interactive GUI 300 for automatically documenting queries, according to example embodiments. In some instances, the interactive GUI 300 may be a stand-alone application or a sub-feature associated with an IDE. The interactive GUI 300 may be operated by one or more users using one or more user device(s) 102 simultaneously. In some embodiments interactive GUI 300 may initiate and play an integral role for processes associated with automatically documenting queries as discussed in FIG. 2 and/or for dynamically populating a graphical user interface with table data as described in relation to FIG. 4. As depicted in FIG. 3, interactive GUI 300 may include several dynamic features for generating queries, auto-documenting queries, and providing query recommendations in real-time.

For example, interactive GUI 300 may include a query generation region 302, query recommendation region 308, and database result region 310. As depicted in query generation region 302, a user may create a query in this region and receive real-time suggestions in feedback as the user inputs information (e.g., a query) into this region. For example, a user may intend to delete a table from a key-value data structure stored in database 106. In furtherance of this objective a user may begin by creating a query in query generation region 302 with a command 304 and additional syntax elements, such as a table name 306. An auto-documentation engine may monitor the input on the query generation region 302 in real-time and implement one or more processes in FIG. 2 and/or FIG. 4. The auto-documentation engine may continuously monitor the input received in the query generation region 302 as long as the interactive GUI 300 is open. In conjunction with server system 104, interactive GUI 300 may display suggestions, as indicated by table name 306, which may be limited to data options associated with syntax tree structure of the command 304 and key-value data structure values stored in database 106. In this instance users are guided on a path of limited syntax options that map the tree structure of the command and therefore reduce the potential for generating erroneous code.

Query recommendation region 308 may be asynchronously and dynamically populated with table data based on the input received in query generation region 302. For example, as the interactive GUI 300 receives input in query generation region 302, query recommendation region may display relevant options indicative of queries that may assist a user inputting code in query generation region 302. Here, in one embodiment, as the command 304 "drop table" is received, query recommendation region 308 may asynchronously provide a recommended query, relevant table data or the extracted metadata, as described in FIG. 2, in the form of recommendations that may include one or more recommendation options. Recommendations may include but are not limited to table names, how many versions of the table associated with the table name exist, the permissions (e.g., database access permissions, table read/write permission, and the like) associated with the user generating the query, the date the table name and its corresponding data were created or deleted, the time/timestamp the table name and its corresponding data were created, and the number of times the recommendation was used by previous users.

While recommendations for the phrase drop table are depicted, it should be understood that the interactive GUI 300 may be configured to receive and dynamically provide recommendations for multiple commands (e.g., "create table" or other target phrases having similar or the same meanings, and the like). Database result region 310 may dynamically and asynchronously display the result of what the query entered into query generation region 302 may do to a table stored in database 106. For example, in one embodiment, in response to a user selecting "option 1" from query recommendation region 308, database result region 310 may display the modified version of what a key-value data structure may be if the "drop table" command is implemented and the "cust_list" table is deleted. Although a drop table modification is depicted in database result region 310, it should be understood that this region may display database results according to several commands (e.g., "create table" and the like) not explicitly depicted in FIG. 3.

Figure 4:
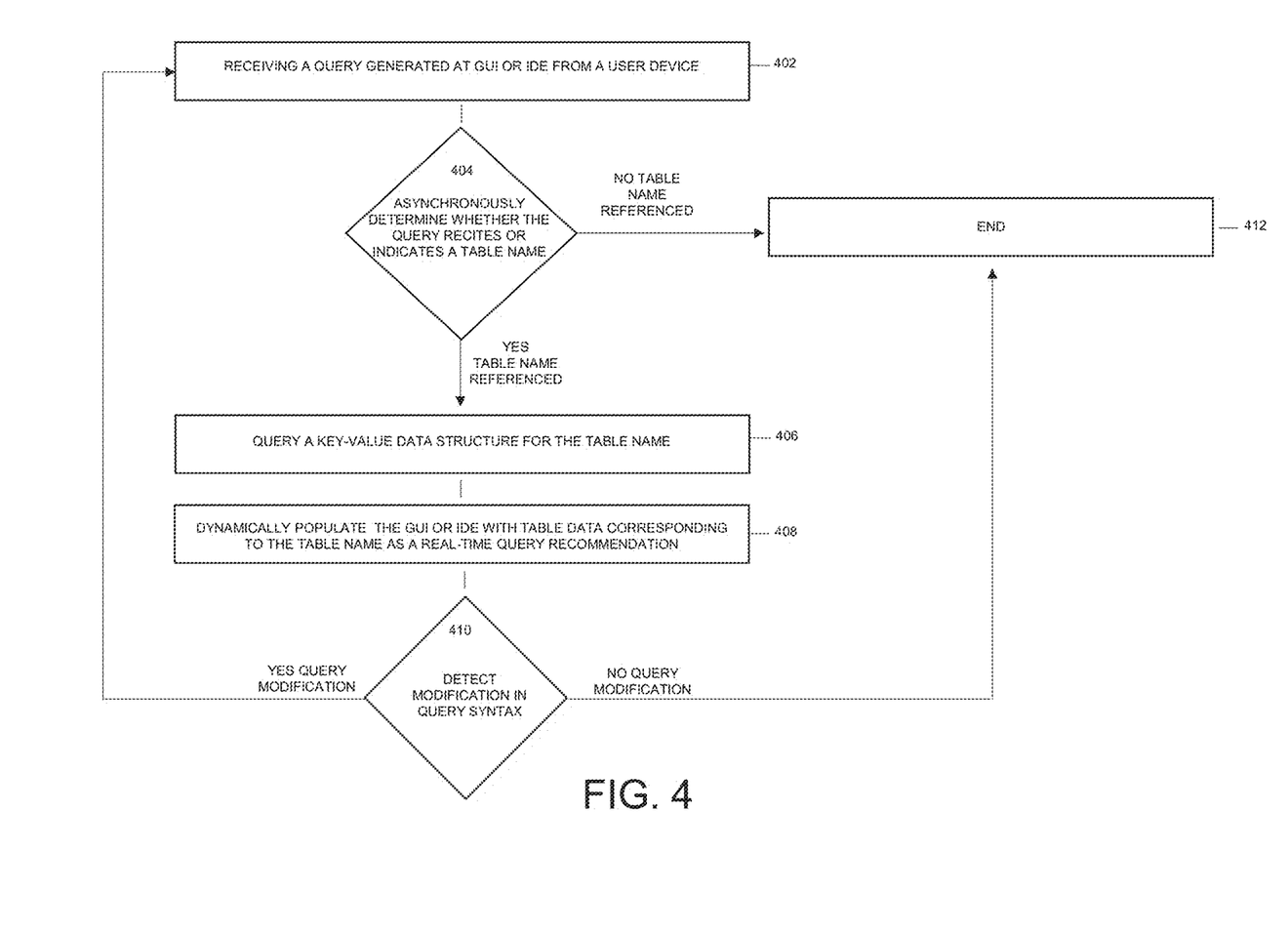
FIG. 4 illustrates a method for dynamically populating a graphical user interface with table data, according to example embodiments of the present disclosure.

FIG. 4 illustrates a method for dynamically populating a GUI with table data, according to one or more embodiments. At 402 server system 104 may receive a query via interactive GUI 300 operating on a user device 102. At 404 the server system 104 may asynchronously determine whether the query recites a table name or that a table name was indicated but may have misspellings, typographical errors, synonyms, or other target phrases having similar or the same meanings. In one instance, at 404, the server system 104 may determine that query does not recite a table name and end the process as depicted at 412.

Alternatively, at 404, server system 104 may determine that a table name is recited or indicated and query a key-value data structure for the recited table name as depicted at 406. For example, server system 104 may parse the query as described in FIG. 2 and, in response to determining that a table name is recited or indicated in the query, server system 104 may reference the key-value data structure for a key matching the table name.

At 408, server system 104 may transmit instructions to the user device 102 to dynamically populate the interactive GUI 300 with table data, corresponding to the table name, as query recommendation in real-time. Here, for example, the interactive GUI 300 may display one or more recommendation options, as depicted in query recommendation region 308.

The server system 104 may continue to monitor the interactive GUI 300 for activity and the presence of text in query generation region 302. Accordingly, at 410, the server system 104 may determine whether there has been a modification to the query syntax on the interactive GUI 300. For example, the server system 104 may determine that the user has modified the initial query (e.g., in response to a query recommendation) or that a new query has been entered, for example in query generation region 302, in a manner such that the modified syntax is different than the syntax in the initial query.

In response to determining that the query has not been modified, server system 104 may end this process at 412. Alternatively, in response to detecting that query syntax has been modified, server system 104 may return to 402 and analyze the query according to the process as described above.

Figure 5:
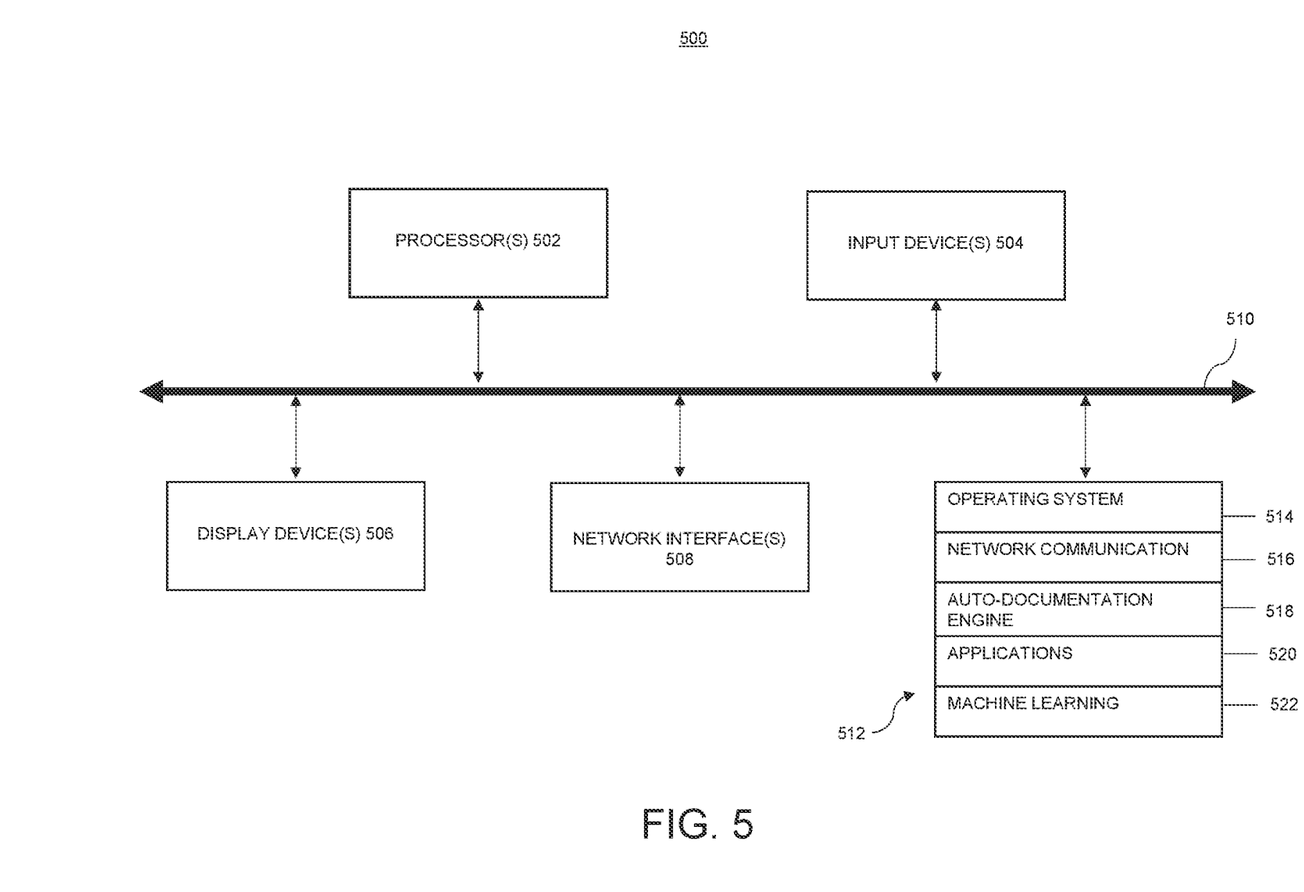
FIG. 5 illustrates a block diagram for a computing device, according to various embodiments of the present disclosure.

FIG. 5 illustrates a block diagram for a computing device, according to various embodiments of the present disclosure. For example, computing device 500 may function as server system 104. The computing device 500 may include a service that provides automatic feedback generation functionality as described above or a portion or combination thereof in some embodiments. The computing device 500 may be implemented on any electronic device that runs software applications derived from compiled instructions, including without limitation personal computers, servers, smart phones, media players, electronic tablets, game consoles, email devices, etc. In some implementations, the computing device 500 may include one or more processor(s) 502, one or more input device(s) 504, one or more display device(s) 506, one or more network interfaces 508, and one or more computer-readable medium(s) 512 storing software instructions. Each of these components may be coupled by bus 510, and in some embodiments, these components may be distributed among multiple physical locations and coupled by a network 108.

Display device(s) 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device(s) 504 may be any known input device technology, including but not limited to a keyboard (including a virtual keyboard), mouse, track ball, camera, and touch-sensitive pad or display. Bus 510 may be any known internal or external bus technology, including but not limited to ISA, EISA, PCI, PCI Express, USB, Serial ATA or FireWire. Computer-readable medium(s) 512 may be any non-transitory medium that participates in providing instructions to processor(s)502 for execution, including without limitation, non-volatile storage media (e.g., optical disks, magnetic disks, flash drives, etc.), or volatile media (e.g., SDRAM, ROM, etc.).

Computer-readable medium(s) 512 may include various instructions for implementing an operating system 514 (e.g., Mac OS®, Windows®, Linux). The operating system may be multi-user, multiprocessing, multitasking, multithreading, real-time, and the like. The operating system may perform basic tasks, including but not limited to: recognizing input from input device(s) 504; sending output to display device(s) 506; keeping track of files and directories on computer-readable medium(s) 512; controlling peripheral devices (e.g., disk drives, printers, etc.) which can be controlled directly or through an I/O controller; and managing traffic on bus 510. Network communications instructions 516 may establish and maintain network connections (e.g., software for implementing communication protocols, such as TCP/IP, HTTP, Ethernet, telephony, etc.).

Auto-documentation engine 518 may include instructions that enable computing device 500 to implement one or more methods as described herein. Application(s) 520 may be an application that uses or implements the processes described herein and/or other processes. The processes may also be implemented in operating system 514. For example, application(s) 520 and/or operating system 514 may execute one or more operations to monitor user interaction with an application and automatically generate user feedback based on the monitored user interaction on the interactive GUI 300.

Machine learning 522 may be used in conjunction with one or more methods as described above. Input (e.g., queries) received at computing device 500 may be fed into a machine learning algorithm to predict/populate query recommendations, as depicted in FIG. 3. Additionally, user selections (e.g., an indication that query recommendation option is selected or not selected) may be fed into the machine learning algorithm to train the machine learning algorithm to populate more relevant query recommendations. For example, in some embodiments, the computing device 500 may train a machine learning model (e.g., an artificial neural network) to detect a known error (or error likelihood) based on a collection of variables. The system may then generate a series of feature inputs based on the training data. For example, the system may generate a first feature input based on training data comprising user data corresponding to a first known error (or error likelihood). The system may label the first feature input with the first known error (e.g., labeling the data as corresponding to a classification of a given error type or likelihood).

The computing device 500 may then train a machine learning model to detect the first known incident based on the labeled first feature input. The system may also train a machine learning model (e.g., the same or different machine learning model) to detect the second known incident based on the labeled second feature input. For example, the training process may involve initializing some random values for each of the training matrices (e.g., of a machine learning model) and attempting to predict the output of the input feature using the initial random values. Initially, the error of the model will be large, but comparing the model's prediction with the correct output (e.g., the known classification), the model is able to adjust the weights and biases values until having the model provides the required predictions.

The described features may be implemented in one or more computer programs that may be executable on a programmable system including at least one programmable processor coupled to receive data and instructions from, and to transmit data and instructions to a data storage system (e.g., database 106), at least one input device, and at least one output device. A computer program is a set of instructions that can be used, directly or indirectly, in a computer to perform a certain activity or bring about a certain result. A computer program may be written in any form of programming language (e.g., Sandbox, SQL, Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

It is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A system for automatically documenting queries comprising: a server comprising one or more processors; and a non-transitory memory, in communication with the server, storing instructions that when executed by the one or more processors, causes the one or more processors to implement a method for: receiving a query and determining whether the query is a candidate for auto-documentation by automatically: parsing the query for one or more strings matching a phrase of, or indicating a command for, create table or drop table, wherein parsing further comprises: separating the query in to one or more sub-queries based on statement terminators included in the query; and determining whether the phrases create table or drop table are recited or indicated in the one or more sub-queries; in response to determining that the phrase drop table is recited or indicated in the one or more sub-queries, automatically: identifying a first table name associated with the phrase drop table; identifying where the first table name is located within a first syntax tree structure corresponding to the phrase drop table; identifying table data associated with the first table name by referencing a key-value data structure; and modifying a table status of the first table name in the key-value data structure to deleted; in response to determining that the phrase create table is recited or indicated in the one or more sub-queries, automatically: identifying a second table name associated with the phrase create table; identifying (i) where the second table name is located within a second syntax tree structure corresponding to the phrase create table, and (ii) where content associated with query is located; extracting metadata from the query, wherein the metadata includes an identifier associated with a user that created the query; modifying a table status of the second table name in the key-value data structure to exists; and storing the second table name as a key and the metadata as table data in the key-value data structure.
2. The system of any one of the preceding embodiments further comprising: receiving a subsequent query created on a graphical user interface (GUI) or integrate development environment (IDE); determining whether the subsequent query references one or more of the first table name, the second table name, or a previously stored table name; in response to determining that the query references one or more of the first table name, the second table name, or a previously stored table name, querying the key-value data structure for stored table data associated with the referenced first table name, second table name, or previously stored table name; and dynamically populating the GUI or the IDE with the stored table data.
3. The system of any one of the preceding embodiments further comprising wherein the stored table data dynamically populated on the GUI or IDE further includes one or more of: a previously stored query used to create the table data or modify the table status to deleted associated with the first table name, the second table name, or the previously stored table name; timestamp associated with creation or deletion of the table data associated with the first table name, the second table name, or the previously stored table name; and the table status associated with creation or deletion of the table data associated with the first table name, the second table name, or the previously stored table name.
4. The system of any one of the preceding embodiments further comprising wherein the metadata further includes one or more of a timestamp and a table status of the first table name or the second table name.
5. The system of any one of the preceding embodiments further comprising wherein the user and one or more other users are assigned permissions, wherein the permissions regulate the user and one or more other users right to read, create, or delete, the key, future keys, or table data on the key-value data structure.
6. The system of any one of the preceding embodiments further comprising wherein the second table name, and its corresponding key and metadata, is a new version of a previously stored second table; and wherein automatically storing the second table name as a key and the metadata as table data in the key-value data structure does not write over the previously stored second table and its corresponding key and metadata in the key-value data structure.
7. The system of any one of the preceding embodiments further comprising wherein a query including the phrase of, or indicating a command for: drop table is limited to syntax elements corresponding to tree paths for dropping a table from the key-value data structure; and create table is limited to syntax elements corresponding to tree paths for creating a table in the key-value data structure.
8. A method that, when executed by one or more processors, cause the processors to effectuate operations comprising those of any of embodiments 1-7.
9. A tangible, non-transitory, machine-readable medium storing instructions that, when executed, by a data processing apparatus, cause: the data processing apparatus to perform operations comprising those of any of embodiments 1-7.
10. A computer-implemented method for automatically documenting queries comprising: receiving, by a processor, a query and determining whether the query is a candidate for auto-documentation by automatically: parsing the query for one or more strings matching a phrase of, or indicating a command for, create table or drop table, wherein parsing further comprises: separating the query in to one or more sub-queries based on one or more statement terminators included in the query; and determining whether the phrases create table or drop table are recited or indicated in the one or more sub-queries; in response to determining that the phrase drop table is recited or indicated in the one or more sub-queries, automatically, by the processor: identifying a first table name associated with the phrase drop table; identifying where the first table name is located within a first syntax tree structure corresponding to the phrase drop table; identifying table data associated with the first table name by referencing a key-value data structure; and modifying a table status of the first table name in the key-value data structure to deleted.
11. The computer-implemented method of any one of the preceding embodiments further comprising: receiving a subsequent query created on a graphical user interface (GUI) or integrated development environment (IDE); determining whether the subsequent query references one or more of the first table name or a previously stored table name; in response to determining that the query references one or more of the first table name or a previously stored table name, querying the key-value data structure for stored table data associated with the referenced first table name or previously stored table name; and dynamically populating the GUI or the IDE with the stored table data.

12. The computer-implemented method of any one of the preceding embodiments further comprising wherein the stored table data dynamically populated on the GUI or IDE further includes one or more of: a previously stored query used to create the table data or modify the table status to deleted associated with the first table name, the second table name, or the previously stored table name; a timestamp associated with creation or deletion of the table data associated with the first table name, the second table name, or the previously stored table name; and the table status associated with creation or deletion of the table data associated with the first table name, the second table name, or the previously stored table name.

13. The computer-implemented method of any one of the preceding embodiments further comprising wherein the key-value data structure further stores metadata including a timestamp of the first table name.

14. The computer-implemented method of any one of the preceding embodiments further comprising wherein a user and one or more other users are assigned permissions, wherein the permissions regulate the user and one or more other users right to read, create, or delete, the key, future keys, or table data on the key-value data structure.

15. The computer-implemented method of any one of the preceding embodiments further comprising wherein modifying a table status of the first table name in the key-value data structure to deleted does not delete the second table name, and its corresponding key and metadata, is a new version of a previously stored second corresponding to the first table name in the key-value data structure.

16. The computer-implemented method of any one of the preceding embodiments further comprising wherein a query including the phrase of, or indicating a command for: drop table is limited to syntax elements corresponding to tree paths for dropping a table from the key-value data structure.

17. A system that, when executed by one or more processors, cause the processors to effectuate operations comprising those of any of embodiments 10-16.

18. A tangible, non-transitory, machine-readable medium storing instructions that, when executed, by a data processing apparatus, cause: the data processing apparatus to perform operations comprising those of any of embodiments 10-17.

19. A computer-implemented method for automatically documenting queries comprising: receiving, by a processor, a query and determining whether the query is a candidate for auto-documentation by automatically: parsing the query for one or more strings matching a phrase of, or indicating a command for, create table or drop table, wherein parsing further comprises: separating the query in to one or more sub-queries based on statement terminators included in the query; and determining whether the phrases create table or drop table are recited or indicated in the one or more sub-queries; in response to determining that the phrase create table is recited or indicated in the one or more sub-queries by the processor, automatically: identifying a second table name associated with the phrase create table; identifying (i) where the second table name is located within a second syntax tree structure corresponding to the phrase create table, and (ii) where content associated with query is located; extracting metadata from the query, wherein the metadata includes an identifier associated with a user that created the query; modifying a table status of the second table name in the a key-value data structure to exists; and storing the second table name as a key and the metadata as table data in the key-value data structure.

20. The computer-implemented method of any one of the preceding embodiments further comprising: receiving a subsequent query created on a graphical user interface (GUI) or integrate development environment (IDE); determining whether the subsequent query references one or more of the second table name or a previously stored table name; in response to determining that the query references one or more of the second table name or a previously stored table name, querying the key-value data structure for stored table data associated with the second table name or previously stored table name; and dynamically populating the GUI or the IDE with the stored table data.

21. The computer-implemented method of any one of the preceding embodiments further comprising wherein the stored table data dynamically populated on the GUI or IDE further includes one or more of: a previously stored query used to create the table data or modify the table status to deleted associated with the second table name or the previously stored table name; a timestamp associated with creation or deletion of the table data associated with the second table name, or the previously stored table name; and the table status associated with creation or deletion of the table data associated with the second table name, or the previously stored table name.

22. The computer-implemented method of any one of the preceding embodiments further comprising wherein the metadata further includes one or more of a timestamp and a table status of the second table name.

23. The computer-implemented method of any one of the preceding embodiments further comprising wherein the user and one or more other users are assigned permissions, wherein the permissions regulate the user and one or more other users right to read, create, or delete, the key, future keys, or table data on the key-value data structure.

24. The computer-implemented method of any one of the preceding embodiments further comprising wherein the second table name, and its corresponding key and metadata, is a new version of a previously stored second table; and wherein automatically storing the second table name as a key and the metadata as table data in the key-value data structure does not write over the previously stored second table and its corresponding key and metadata in the key-value data structure.

25. A system that, when executed by one or more processors, cause the processors to effectuate operations comprising those of any of embodiments 19-24.

26. A tangible, non-transitory, machine-readable medium storing instructions that, when executed, by a data processing apparatus, cause: the data processing apparatus to perform operations comprising those of any of embodiments 19-24.

What is claimed is:

1. A system for automatically documenting queries comprising:
　a server comprising one or more processors; and
　a non-transitory memory, in communication with the server, storing instructions that when executed by the one or more processors, causes the one or more processors to implement a method comprising:
　　receiving a query entered and created on a graphical user interface (GUI) and determining whether the query is a candidate for auto-documentation by automatically:
　　　parsing the query for one or more strings matching a phrase of, or indicating a command for, create table or drop table, wherein parsing further comprises:
　　　　separating the query into one or more sub-queries based on one or more statement terminators included in the query; and
　　　　determining whether the phrases create table or drop table are recited or indicated in the one or more sub-queries;
　　in response to determining that the phrase drop table is recited or indicated in the one or more sub-queries, automatically:
　　　identifying a first table name associated with the phrase drop table;
　　　traversing a first syntax tree structure corresponding to the phrase drop table, wherein the phrase drop table is limited to syntax elements corresponding to tree paths for dropping a table from a key-value data structure;
　　　identifying where the first table name is located within the first syntax tree structure;
　　　dynamically populating the GUI with selectable syntax options associated with the phrase drop table;
　　　receiving an input associated with the selectable syntax options;
　　　identifying, based on the input, table data associated with the first table name by referencing a key-value data structure; and
　　　modifying a table status of the first table name in the key-value data structure to deleted;
　　in response to determining that the phrase create table is recited or indicated in the one or more sub-queries, automatically:
　　　identifying a second table name associated with the phrase create table;
　　　traversing a second syntax tree structure corresponding to the phrase create table, wherein the phrase create table is limited to syntax elements corresponding to tree paths for creating the table from the key-value data structure;
　　　identifying (i) where the second table name is located within the second syntax tree structure corresponding to the phrase create table, and (ii) where content associated with query is located;
　　　dynamically populating the GUI with selectable syntax options associated with the phrase create table;
　　　receiving an input associated with the selectable syntax options;
　　　extracting metadata from the query, based on the input, wherein the metadata includes an identifier associated with a user that created the query;
　　　modifying a table status of the second table name in the key-value data structure to exists; and
　　　storing the second table name as a key and the metadata as table data in the key-value data structure.

2. The system of claim 1 further comprising:
　receiving a subsequent query created on the graphical user interface (GUI) or integrated development environment (IDE);
　determining whether the subsequent query references one or more of the first table name, the second table name, or a previously stored table name;
　in response to determining that the subsequent query references one or more of the first table name, the second table name, or a previously stored table name, querying the key-value data structure for stored table data associated with the referenced first table name, second table name, or previously stored table name; and
　dynamically populating the GUI or the IDE with the stored table data.

3. The system of claim 2, wherein the stored table data dynamically populated on the GUI or IDE further includes one or more of:
　a previously stored query used to create the table data or modify the table status to deleted associated with the first table name, the second table name, or the previously stored table name;
　a timestamp associated with creation or deletion of the table data associated with the first table name, the second table name, or the previously stored table name; and
　the table status associated with creation or deletion of the table data associated with the first table name, the second table name, or the previously stored table name.

4. The system of claim 1, wherein the metadata further includes one or more of a timestamp and a table status of the first table name or the second table name.

5. The system of claim 1, further comprising wherein a user and one or more other users are assigned permissions, wherein the permissions regulate the user and one or more other users right to read, create, or delete, the key, future keys, or table data on the key-value data structure.

6. The system of claim 1, further comprising wherein the second table name, and its corresponding key and metadata, is a new version of a previously stored second table; and
　wherein automatically storing the second table name as a key and the metadata as table data in the key-value data structure does not write over the previously stored second table and its corresponding key and metadata in the key-value data structure.

7. The system of claim 1, further comprises wherein a query including the phrase of, or indicating a command for:
　drop table is limited to syntax elements corresponding to tree paths for dropping a table from the key-value data structure; and
　create table is limited to syntax elements corresponding to tree paths for creating a table in the key-value data structure.

8. A computer-implemented method for automatically documenting queries comprising:
　receiving, by a processor, a query entered and created on a graphical user interface (GUI) and determining whether the query is a candidate for auto-documentation by automatically:
　　parsing the query for one or more strings matching a phrase of, or indicating a command for, create table or drop table, wherein parsing further comprises:

separating the query in to one or more sub-queries based on one or more statement terminators included in the query; and determining whether the phrases create table or drop table are recited or indicated in the one or more sub-queries;

in response to determining that the phrase drop table is recited or indicated in the one or more sub-queries, automatically, by the processor:

identifying a first table name associated with the phrase drop table;

traversing a first syntax tree structure corresponding to the phrase drop table, wherein the phrase drop table is limited to syntax elements corresponding to tree paths for dropping a table from a key-value data structure;

identifying where the first table name is located within the first syntax tree structure;

dynamically populating the GUI with selectable syntax options associated with the phrase drop table;

receiving an input associated with the selectable syntax options;

identifying, based on the input, table data associated with the first table name by referencing a key-value data structure; and modifying a table status of the first table name in the key-value data structure to deleted.

9. The computer-implemented method of claim 8 further comprising:

receiving a subsequent query created on the graphical user interface (GUI) or integrated development environment (IDE);

determining whether the subsequent query references one or more of the first table name or a previously stored table name;

in response to determining that the query references one or more of the first table name or the previously stored table name, querying the key-value data structure for stored table data associated with the referenced first table name or previously stored table name; and dynamically populating the GUI or the IDE with the stored table data.

10. The computer-implemented method of claim 9, wherein the stored table data dynamically populated on the GUI or IDE further includes one or more of:

a previously stored query used to create the table data or modify the table status to deleted associated with the first table name or the previously stored table name;

a timestamp associated with creation or deletion of the table data associated with the first table name or the previously stored table name; and the table status associated with creation or deletion of the table data associated with the first table name or the previously stored table name.

11. The computer-implemented method of claim 8, wherein the key-value data structure further stores metadata including a timestamp of the first table name.

12. The computer-implemented method of claim 8, further comprising wherein a user and one or more other users are assigned permissions, wherein the permissions regulate the user and one or more other users right to read, create, or delete, a key, future keys, or table data on the key-value data structure.

13. The computer-implemented method of claim 8, further comprising wherein modifying a table status of the first table name in the key-value data structure to deleted does not delete metadata corresponding to the first table name in the key-value data structure.

14. The computer-implemented method of claim 8, further comprises wherein a query including the phrase of, or indicating a command for:

drop table is limited to syntax elements corresponding to tree paths for dropping a table from the key-value data structure.

15. A computer-implemented method for automatically documenting queries comprising:

receiving, by a processor, a query entered and created on a graphical user interface (GUI) and determining whether the query is a candidate for auto-documentation by automatically:

parsing the query for one or more strings matching a phrase of, or indicating a command for, create table or drop table, wherein parsing further comprises:

separating the query in to one or more sub-queries based on statement terminators included in the query; and determining whether the phrases create table or drop table are recited or indicated in the one or more sub-queries;

in response to determining that the phrase create table is recited or indicated in the one or more sub-queries by the processor, automatically:

identifying a second table name associated with the phrase create table;

traversing a second syntax tree structure corresponding to the phrase create table, wherein the phrase create table is limited to syntax elements corresponding to tree paths for creating a table from a key-value data structure;

identifying (i) where the second table name is located within the second syntax tree structure corresponding to the phrase create table, and (ii) where content associated with query is located;

dynamically populating the GUI with selectable syntax options associated with the phrase create table;

receiving an input associated with the selectable syntax options;

extracting metadata from the query, based on the input, wherein the metadata includes an identifier associated with a user that created the query;

modifying a table status of the second table name in a key-value data structure to exists; and storing the second table name as a key and the metadata as table data in the key-value data structure.

16. The computer-implemented method of claim 15 further comprising:

receiving a subsequent query created on the graphical user interface (GUI) or integrate development environment (IDE);

determining whether the subsequent query references one or more of the second table name or a previously stored table name;

in response to determining that the query references one or more of the second table name or the previously stored table name, querying the key-value data structure for stored table data associated with the second table name, or previously stored table name; and dynamically populating the GUI or the IDE with the stored table data.

17. The computer-implemented method of claim 16, wherein the stored table data dynamically populated on the GUI or IDE further includes one or more of:
- a previously stored query used to create the table data or modify the table status to deleted associated with the second table name or the previously stored table name;
- a timestamp associated with creation or deletion of the table data associated with the second table name or the previously stored table name; and
- the table status associated with creation or deletion of the table data associated with the second table name or the previously stored table name.

18. The computer-implemented method of claim 15, wherein the metadata further includes one or more of a timestamp and a table status of the second table name.

19. The computer-implemented method of claim 15, further comprising wherein a user and one or more other users are assigned permissions, wherein the permissions regulate the user and one or more other users right to read, create, or delete, the key, future keys, or table data on the key-value data structure.

20. The computer-implemented method of claim 15, further comprises wherein the second table name, and its corresponding key and metadata, is a new version of a previously stored second table; and
- wherein automatically storing the second table name as a key and the metadata as table data in the key-value data structure does not write over the previously stored second table and its corresponding key and metadata in the key-value data structure.

* * * * *